(12) United States Patent
Chang

(10) Patent No.: US 9,459,393 B2
(45) Date of Patent: Oct. 4, 2016

(54) BACKLIGHT MODULE STRUCTURE

(71) Applicant: Shenzhen China Star Optoelectronics Technology Co., Ltd., Shenzhen, Guangdong (CN)

(72) Inventor: Jianyu Chang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 111 days.

(21) Appl. No.: 14/390,387

(22) PCT Filed: Aug. 15, 2014

(86) PCT No.: PCT/CN2014/084458
§ 371 (c)(1),
(2) Date: Oct. 2, 2014

(87) PCT Pub. No.: WO2016/019596
PCT Pub. Date: Feb. 11, 2016

(65) Prior Publication Data
US 2016/0041326 A1    Feb. 11, 2016

(30) Foreign Application Priority Data
Aug. 6, 2014  (CN) .......................... 2014 1 0385453

(51) Int. Cl.
*F21V 8/00*    (2006.01)
(52) U.S. Cl.
CPC ........... *G02B 6/0021* (2013.01); *G02B 6/0068* (2013.01); *G02B 6/0073* (2013.01)
(58) Field of Classification Search
CPC ........................... F02B 6/0021; F02B 6/0068
See application file for complete search history.

(56) References Cited

U.S. PATENT DOCUMENTS

| 2007/0120109 | A1 | 5/2007 | Mizuyoshi | |
|---|---|---|---|---|
| 2009/0058306 | A1* | 3/2009 | Itaya | G02B 6/0011 |
| | | | | 315/149 |
| 2010/0002169 | A1* | 1/2010 | Kuramitsu | G02B 6/0021 |
| | | | | 349/65 |
| 2012/0300135 | A1* | 11/2012 | Cho | G02B 6/0021 |
| | | | | 348/739 |

FOREIGN PATENT DOCUMENTS

| CN | 101435891 A | 5/2009 |
|---|---|---|
| CN | 101495799 A | 7/2009 |
| KR | 2009-0071912 A | 7/2009 |

* cited by examiner

*Primary Examiner* — Elmito Breval
(74) *Attorney, Agent, or Firm* — Andrew C. Cheng

(57) ABSTRACT

The present invention provides a backlight module structure, which includes a backplane (1), a light guide plate (3) arranged inside the backplane (1), and at least two backlight sources (5) arranged inside the backplane (1). The backplane (1) includes a bottom board (11) and a plurality of side boards (13) perpendicularly connected to the bottom board (11). The light guide plate (3) includes at least two sub light guide plates (4) that are sequentially connected in such a way that a recess (33) is formed in a connection between two adjacent ones of the sub light guide plates (4). The recess (33) has an opening facing the bottom board (11). The bottom board (11) includes a protrusion (111) formed thereon to correspond to the recess (33). The at least two backlight sources (5) are mounted on the protrusion (111) and located between the recess (33) and the protrusion (111) so that the two backlight sources (5) emit lights respectively toward the two adjacent sub light guide plates (4). The backlight module structure suits the need for size enlarging of light guide plates and also better achieves dynamic light adjustment, reduce energy consumption, and improve optical quality.

9 Claims, 4 Drawing Sheets

BACKLIGHT MODULE STRUCTURE

BACKGROUND OF THE INVENTION

1. Field of the Invention

The present invention relates to the field of liquid crystal displaying, and in particular to a backlight module structure.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module for generating images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to directly form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

As shown in FIG. 1, which is a schematic view showing a conventional side-edge backlight module structure, the conventional side-edge backlight module comprises: a backplane 100, an LED (Light-Emitting Diode) light guide plate 300 arranged in the backplane 100, a light source 500 arranged at one side of the light guide plate 300 and mounted to a heat dissipation board 800, a mold frame 700 arranged above the backlight source 500 and the light guide plate 300 and mounted to the backplane 100, an optic film assembly 900 arranged on the light guide plate 300, a bottom reflector plate 200 arranged between a bottom board 130 of the backplane 100 and the light guide plate 300, a plurality of grid points 400 formed on a surface of the light guide plate 300 that is adjacent to the bottom reflector plate 200, and a reflector plate 600 arranged above the LED light source 500 and mounted to a corresponding portion of the mold frame 700.

The light guide plate 300 of the conventional side-edge backlight module structure is unitary. Due to constraints of the machine size and the manufacturing techniques, it is only possible to manufacture unitary light guide plates that are of relatively small sizes. Recently, the liquid crystal displays, especially liquid crystal televisions, is being developed toward being size enlarging (such as 110 inches) and thinning. Correspondingly, related optical components included in the backlight module structures must suit the need of size enlarging. However, the unitary light guide plates obviously do not meet such a need and further improvements are required in order to facilitate the development of the liquid crystal televisions toward even being larger in sizes and thinner.

SUMMARY OF THE INVENTION

An object of the present invention is to provide a backlight module structure, which suits the needs for size enlarging of light guide plates and can better achieve dynamic light adjustment, saving energy consumption, and enhancing optical quality.

To achieve the above object, the present invention provides a backlight module structure, which comprises a backplane, a light guide plate arranged inside the backplane, and at least two backlight sources arranged inside the backplane. The backplane comprises a bottom board and a plurality of side boards perpendicularly connected to the bottom board. The light guide plate comprises at least two sub light guide plates that are sequentially connected in such a way that a recess is formed in connection between two adjacent ones of the sub light guide plates. The recess has an opening facing the bottom board. The bottom board comprises a protrusion formed thereon to correspond to the recess. The at least two backlight sources are mounted on the protrusion and located between the recess and the protrusion so that the two backlight sources emit lights respectively toward the two adjacent sub light guide plates.

Each of the sub light guide plates comprises, at a connection thereof, a connection surface substantially perpendicular to a top surface of the sub light guide plate and a light incidence surface connected to the connection surface and recessed inwardly of the sub light guide plate. The connection surfaces of two adjacent ones of the sub light guide plates re positioned against each other and the light incidence surfaces of the adjacent ones of the sub light guide plates collectively define the recess.

The light incidence surface is an inclined surface and a cross-sectional configuration of the recess is an inverted V-shape.

The protrusion of the bottom board has an inverted V-shaped cross-section and the protrusion comprises first and second inclined surfaces opposite to each other. The two backlight sources are respectively mounted to the first and second inclined surfaces.

The protrusion has an apex angle φ that is greater than 90°. The first and second inclined surfaces are respectively parallel to the light incidence surfaces corresponding thereto.

The sub light guide plates are each integrally formed through injection molding or are formed through roll forming and then cutting.

The sub light guide plates each have a bottom on which a plurality of grid points is formed.

The backlight sources are each an LED (Light-Emitting Diode) light bar.

The LED light bar is of an arrangement of surface mounted device (SMD) or chip-on-board (COB).

The backlight module structure further comprises an optic film assembly arranged on the light guide plate and a mold frame arranged on the light guide plate and mounted to the side boards of the backplane.

The efficacy of the present invention is that the present invention provides a backlight module structure, which comprises a light guide plate that comprises at least two sub light guide plates that are sequentially connected in such a way as to define a recess between two adjacent ones of the sub light guide plates and a backplane having a bottom board that comprises a protrusion formed thereon to correspond to the recess, where at least two backlight sources are both mounted on the protrusion and located between the recess and the protrusion, so that the needs of the light guide plate for size enlarging can be met and dynamic light adjustment can be better achieved, energy consumption reduced, optical quality improved, and the structure is simple and is easy to achieve.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
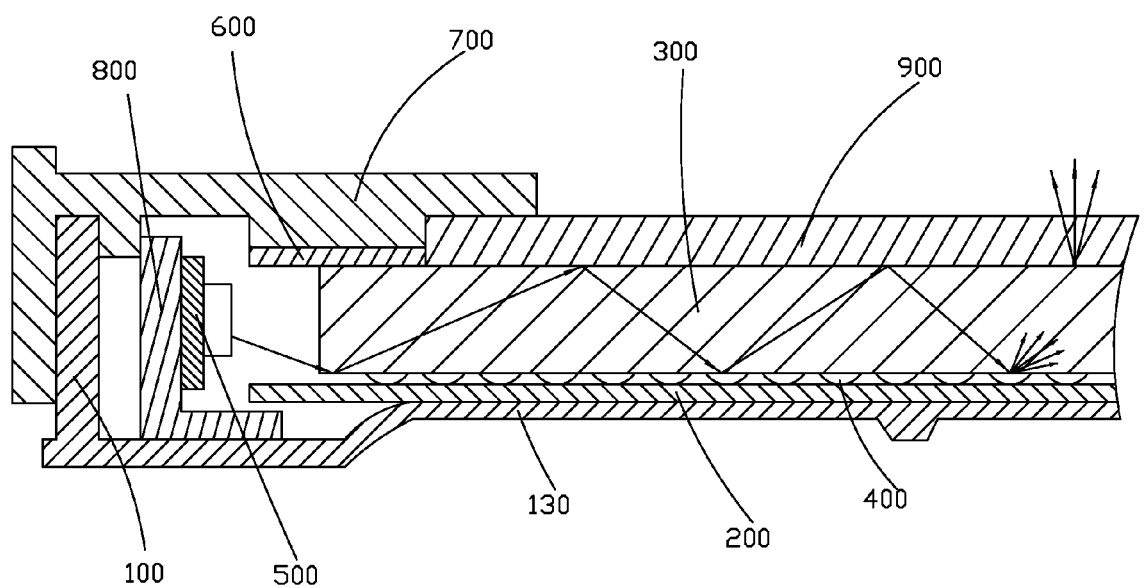
FIG. 1 is a schematic view showing a conventional side-edge backlight module structure.
Figure 2:
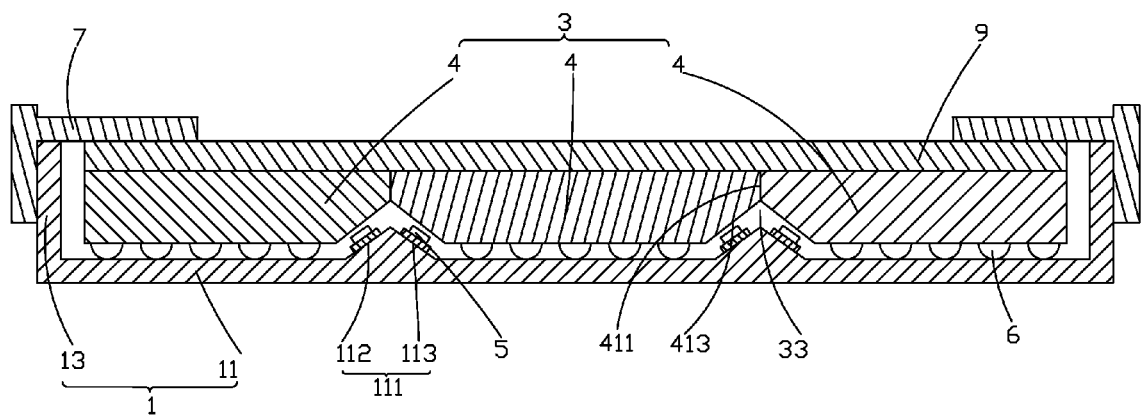
FIG. 2 is a schematic view showing a backlight module structure according to the present invention.
Figure 3:
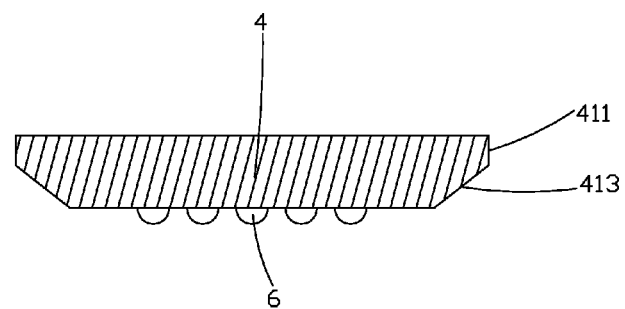
FIG. 3 is a schematic view showing a sub light guide plate of the backlight module structure according to the present invention.
Figure 4:
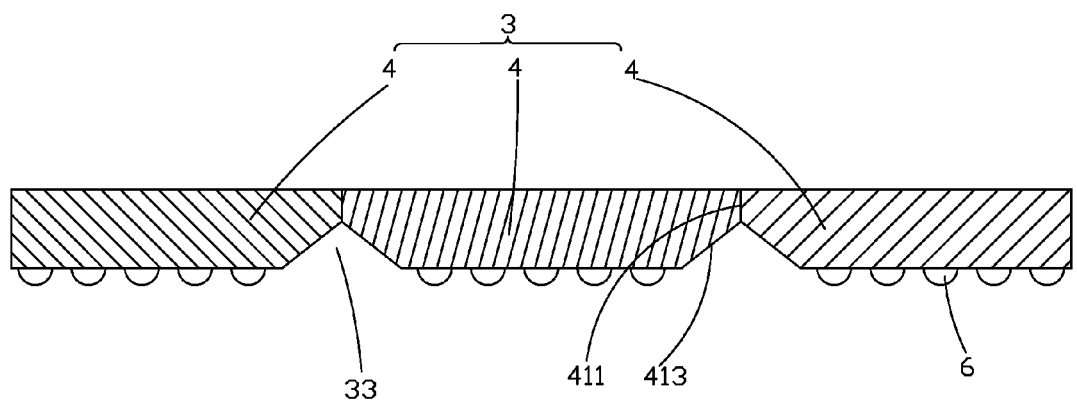
FIG. 4 is a schematic view showing a light guide plate of the backlight module structure according to the present invention.

To further expound the technical solution adopted in the present invention and the advantages thereof, a detailed description is given to a preferred embodiment of the present invention and the attached drawings.

Referring to FIGS. 2-7, the present invention provides a backlight module structure. The backlight module structure comprises a backplane 1, a light guide plate 3 arranged inside the backplane 1, and at least two backlight sources 5 arranged inside the backplane 1.

The backplane 1 comprises a bottom board 11 and a plurality of side boards 13 perpendicularly connected to the bottom board 11. The backplane can be made of aluminum plates.

It is noted here that the light guide plate 3 comprises at least two sub light guide plates 4 that are sequentially connected in such a way that a recess 33 is formed in the connection between two adjacent ones of the sub light guide plates 4. The recess 33 has an opening facing the bottom board 11. The bottom board 11 comprises a protrusion 111 formed thereon to correspond to the recess 33 and the at least two backlight sources 5 are both mounted on the protrusion 111 and located between the recess 33 and the protrusion 111 so that the backlight sources 5 emit lights respectively toward the two adjacent sub light guide plates 4.

In a practical manufacturing process, a desired number of sub light guide plates 4 can be provided and connected according to design requirements in order to obtain a size-enlarged light guide plate 3, which suites the needs of size enlarging of the light guide plate. Referring to FIGS. 2, 3, 4, and 7, the present invention will be described by taking an example that the light guide plate 3 is composed of three sub light guide plates 4 sequentially connected to each other. Each of the sub light guide plates 4 comprises, at a connection thereof, a connection surface 411 substantially perpendicular to a top surface of the sub light guide plate 4 and a light incidence surface 413 connected to the connection surface 411 and recessed inwardly of the sub light guide plate 4. The connection surfaces 411 of two adjacent ones of the sub light guide plates 4 are positioned against each other and the light incidence surfaces 413 of the adjacent ones of the sub light guide plates 4 collectively define the recess 33 in order to achieve connection between the two adjacent ones of the sub light guide plates 4.

Specifically, the light incidence surface 413 can be an inclined surface or a curved surface and correspondingly, the recess 33 has a cross-sectional configuration of an inverted V-shape or an inverted U-shape. Preferably, the light incidence surface 413 is an inclined surface and the cross-sectional configuration of the recess 33 is an inverted V-shape.

It is noted here that the sub light guide plates 4 each have a bottom surface on which a plurality of grid points 6 is formed. The plurality of grid points 6 functions to diffuse light, adjust distribution of light, and thus homogenize the light and are of a shape of semicircle, semi-ellipse, three-edged cone, four-edged cone, or pyramid.

The sub light guide plates 4 can each be integrally formed through injection molding, or an alternative process that roll forming is applied to form a plurality of sub light guide plates 4 and then cutting is applied to provide a plurality of individual sub light guide plates 4 can be adopted.

Figure 5:
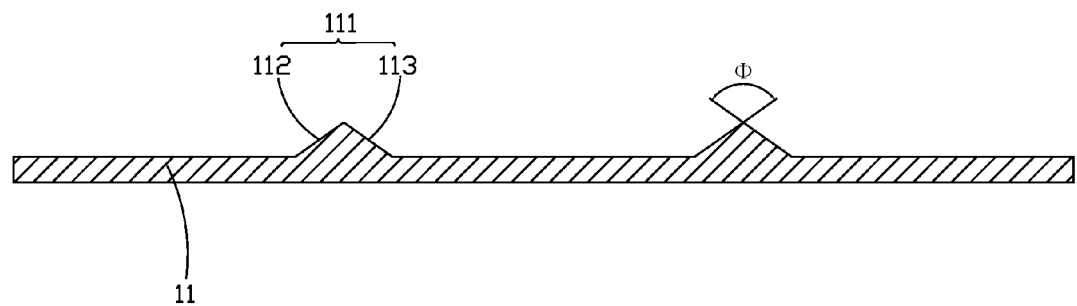
FIG. 5 is a schematic view showing a bottom board of a backplane of the backlight module structure according to the present invention.
Figure 6:
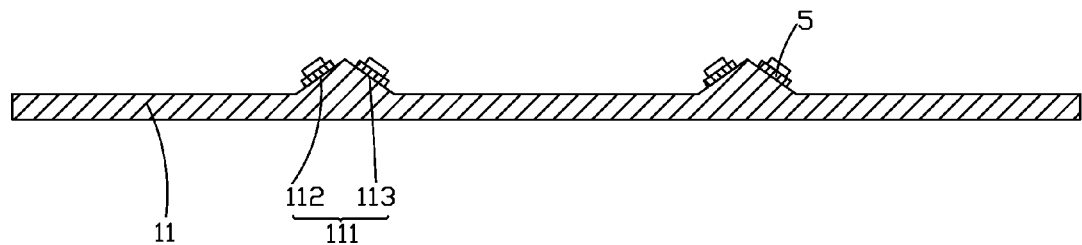
FIG. 6 is a schematic view showing an LED light source mounted on the bottom board of the backplane of the backlight module structure according to the present invention.
Figure 7:
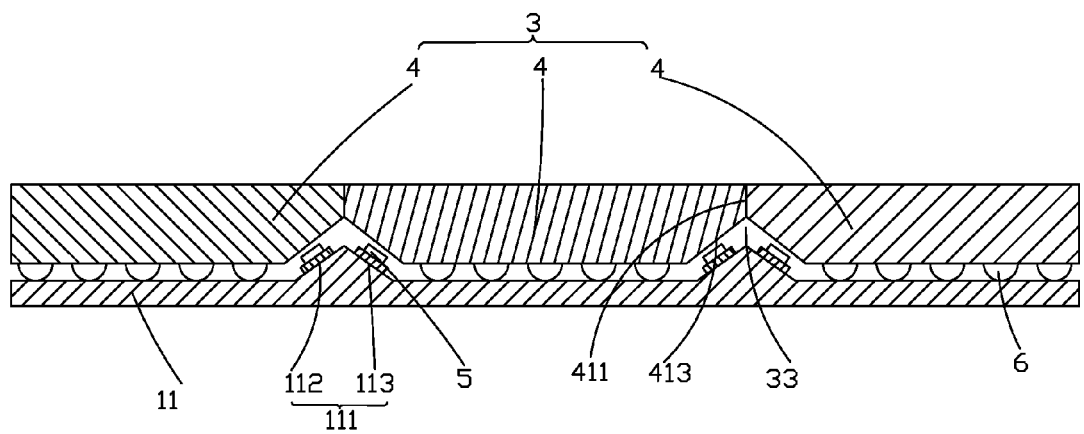
FIG. 7 is a schematic view showing a combination of the bottom board of the backplane, the LED light source, and the light guide plate of the backlight module structure according to the present invention.

Referring to FIGS. 5, 6, and 7, corresponding to each of the recesses 33 that have an inverted V-shaped cross-sectional configuration, the protrusion 111 formed on the bottom board 11 is also of a cross-sectional configuration of an inverted V-shape, and the protrusion 111 has a height that is less than a depth of the recess 33 so that a gap is formed between the protrusion 111 and the recess 33 for accommodating the backlight sources 5 therein. The protrusion 111 comprises first and second inclined surfaces 112, 113 that are arranged opposite to each other and the first and second inclined surfaces 112, 113 are respectively set in parallel to the light incidence surfaces 413. The two backlight sources 5 are respectively mounted on the first and second inclined surfaces 112, 113 and are located between the protrusion 111 and the recess 33. Such an arrangement, on the one hand, increases light coupling efficiency, reduce optical loss, and avoids light leak at edges of a liquid crystal display so as to better achieve dynamic light adjustment and enhance optical quality and, on the other hand, allows the backlight sources 5 to directly mounted on the bottom board 11 of the backplane 1 to facilitate heat dissipation.

Further, the protrusions 111 have an apex angle φ that is greater than 90° in order to prevent excessive height of the protrusions 111 for facilitating thinning of the liquid crystal display.

The backlight sources 5 each comprise an LED (Light-Emitting Diode) light bar. Specifically, the LED light bar may use the arrangement of surface mounted device (SMD) or chip-on-board (COB).

The backlight module structure further comprises an optic film assembly 9 arranged on the light guide plate 3 and a mold frame 7 arranged on the light guide plate 3 and mounted to the side boards 13 of the backplane In summary, the present invention provides a backlight module structure, which comprises a light guide plate that comprises at least two sub light guide plates that are sequentially connected in such a way as to define a recess between two adjacent ones of the sub light guide plates and a backplane having a bottom board that comprises a protrusion formed thereon to correspond to the recess, where at least two backlight sources are both mounted on the protrusion and located between the recess and the protrusion, so that the needs of the light guide plate for size enlarging can be met and dynamic light adjustment can be better achieved, energy consumption reduced, optical quality improved, and the structure is simple and is easy to achieve.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module structure, comprising a backplane, a light guide plate arranged inside the backplane, and at least two backlight sources arranged inside the backplane, the backplane comprising a bottom board and a plurality of side boards perpendicularly connected to the bottom board, the light guide plate comprising at least two sub light guide plates that are sequentially connected in such a way that a recess is formed in connection between two adjacent ones of the sub light guide plates, the recess having an opening facing the bottom board, the bottom board comprising a protrusion formed thereon to correspond to the recess, the at least two backlight sources being mounted on the protrusion and located between the recess and the protrusion so that the two backlight sources emit lights respectively toward the two adjacent sub light guide plates;

wherein each of the sub light guide plates comprises, at a connection thereof, a connection surface substantially perpendicular to a top surface of the sub light guide plate and a light incidence surface connected to the connection surface and inclined with respect to the connection surface and the top surface such that the light incidence surfaces of two adjacent ones of the sub light guide plates collectively define the recess that has a cross-sectional configuration of an inverted V-shape;

wherein the protrusion of the bottom board has an inverted V-shaped cross-section corresponding to the inverted V-shape of the recess between the two adjacent ones of the sub light guide plates and the protrusion comprises first and second inclined surfaces opposite to each other and respectively corresponding to the light incidence surfaces of the two adjacent ones of the sub light guide plates, the two backlight sources being respectively mounted to the first and second inclined surfaces; and wherein the first and second inclined surfaces of the protrusion are respectively parallel to the light incidence surfaces of the two adjacent ones of the sub light guide plates corresponding thereto such that the backlight sources mounted to the first and second inclined surfaces are directly facing toward the light incidence surfaces of the two adjacent ones of the sub light guide plates to increase light coupling efficiency.

2. The backlight module structure as claimed in claim 1, wherein the connection surfaces of the two adjacent ones of the sub light guide plates are positioned against each other.

3. The backlight module structure as claimed in claim 1, wherein the first and second inclined surfaces of the protrusion define therebetween an apex angle that is greater than 90°.

4. The backlight module structure as claimed in claim 1, wherein the sub light guide plates are each integrally formed through injection molding or are formed through roll forming and then cutting.

5. The backlight module structure as claimed in claim 4, wherein the sub light guide plates each have a bottom on which a plurality of grid points is formed.

6. The backlight module structure as claimed in claim 1, wherein the backlight sources are each an LED (Light-Emitting Diode) light bar.

7. The backlight module structure as claimed in claim 6, wherein the LED light bar is of an arrangement of surface mounted device (SMD) or chip-on-board (COB).

8. The backlight module structure as claimed in claim 1 further comprising an optic film assembly arranged on the light guide plate and a mold frame arranged on the light guide plate and mounted to the side boards of the backplane.

9. A backlight module structure, comprising a backplane, a light guide plate arranged inside the backplane, and at least two backlight sources arranged inside the backplane, the backplane comprising a bottom board and a plurality of side boards perpendicularly connected to the bottom board, the light guide plate comprising at least two sub light guide plates that are sequentially connected in such a way that a recess is formed in connection between two adjacent ones of the sub light guide plates, the recess having an opening facing the bottom board, the bottom board comprising a protrusion formed thereon to correspond to the recess, the at least two backlight sources being mounted on the protrusion and located between the recess and the protrusion so that the two backlight sources emit lights respectively toward the two adjacent sub light guide plates;

wherein each of the sub light guide plates comprises, at a connection thereof, a connection surface substantially perpendicular to a top surface of the sub light guide plate and a light incidence surface connected to the connection surface and inclined with respect to the connection surface and the top surface such that the light incidence surfaces of two adjacent ones of the sub light guide plates collectively define the recess that has a cross-sectional configuration of an inverted V-shape;

wherein the protrusion of the bottom board has an inverted V-shaped cross-section corresponding to the inverted V-shape of the recess between the two adjacent ones of the sub light guide plates and the protrusion comprises first and second inclined surfaces opposite to each other and respectively corresponding to the light incidence surfaces of the two adjacent ones of the sub light guide plates, the two backlight sources being respectively mounted to the first and second inclined surfaces;

wherein the first and second inclined surfaces of the protrusion are respectively parallel to the light incidence surfaces of the two adjacent ones of the sub light guide plates corresponding thereto such that the backlight sources mounted to the first and second inclined surfaces are directly facing toward the light incidence surfaces of the two adjacent ones of the sub light guide plates to increase light coupling efficiency;

wherein the connection surface of the two adjacent ones of the sub light guide plates are positioned against each other;

wherein the first and second inclined surfaces of the protrusion define therebetween an apex angle that is greater than 90°;

wherein the sub light guide plates are each integrally formed through injection molding or are formed through roll forming and then cutting;

wherein the sub light guide plates each have a bottom on which a plurality of grid points is formed;

wherein the backlight sources are each an LED (Light-Emitting Diode) light bar;

wherein the LED light bar is of an arrangement of surface mounted device (SMD) or chip-on-board (COB); and wherein the backlight module structure further comprises an optic film assembly arranged on the light guide plate and a mold frame arranged on the light guide plate and mounted to the side boards of the backplane.

* * * * *